(12) United States Patent
Lee et al.

(10) Patent No.: US 7,342,731 B2
(45) Date of Patent: Mar. 11, 2008

(54) WAFER SCALE LENS AND OPTICAL SYSTEM HAVING THE SAME

(75) Inventors: Sang Hyuck Lee, Kyungki-do (KR); Sung Hwa Kim, Seoul (KR); Chon Su Kyong, Seoul (KR); Ho Seop Jeong, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 130 days.

(21) Appl. No.: 11/403,814

(22) Filed: Apr. 14, 2006

(65) Prior Publication Data
US 2006/0262416 A1 Nov. 23, 2006

(30) Foreign Application Priority Data
May 18, 2005 (KR) .................. 10-2005-0041528

(51) Int. Cl.
*G02B 9/34* (2006.01)
*G02B 3/00* (2006.01)

(52) U.S. Cl. .................. 359/772; 359/642; 359/737; 359/741; 359/754

(58) Field of Classification Search .............. 359/642, 359/737, 741, 754, 771, 772, 773
See application file for complete search history.

(56) References Cited

U.S. PATENT DOCUMENTS

2002/0191273 A1* 12/2002 Feldman et al. ............ 359/280
2005/0018962 A1* 1/2005 Cho et al. .................... 385/33

\* cited by examiner

*Primary Examiner*—Scott J. Sugarman
*Assistant Examiner*—Darryl J. Collins
(74) *Attorney, Agent, or Firm*—Lowe Hauptman Ham & Berner

(57) ABSTRACT

Provided are wafer scale lenses having a diffraction surface as well as a refractive surface, and an optical system having the same. The wafer scale lens includes a lens substrate, a first lens element formed on the object side of the lens substrate, having a positive refractive power, a second lens element formed on the image side of the lens substrate, having a diffraction surface, and a third lens element deposited on the diffraction surface of the second lens element, having a negative refractive power. The invention allows miniaturized optical system and efficient calibration of angle of view, reducing the angle of light incident onto the diffractive surface, thereby increasing diffraction efficiency and eliminating high order diffraction light to improve picture quality.

13 Claims, 13 Drawing Sheets

WAFER SCALE LENS AND OPTICAL SYSTEM HAVING THE SAME

CLAIM OF PRIORITY

This application claims the benefit of Korean Patent Application No. 2005-41528 filed on May 18, 2005, in the Korean Intellectual Property Office, the disclosure of which is incorporated herein by reference.

BACKGROUND OF THE INVENTION

1. Field of the Invention

The present invention relates to a wafer scale lens used for an image-pickup optical system and an optical system having the same. More particularly, the present invention relates to an optical system which can achieve superior optical capability using a diffraction surface and a refractive surface.

2. Description of the Related Art

In general, mobile phones had only communicative functions in their recipient stage. However, with extensive use of the mobile phones, the services required therefrom have been diverse including camera function, image transmission, and telecommunication. Thus, the functions and the services of mobile phones have been constantly evolving. In the meantime, a new concept of mobile phones has been popularized these days, in which digital camera and mobile phone have been merged in technology. They are so called camera phones or camera mobile phones. In addition, so called camcorder mobile phones or camcorder phones have been developed recently, in which digital camcorder technology is incorporated into mobile phone technology, thereby allowing saving and transmitting multi-media moving pictures of more than tens of minutes.

Besides the mobile phones, with computers being popularized, PC cameras have become available in a short period of time for video chatting or video conferencing. Meanwhile, still cameras have been quickly substituted with digital cameras.

These cameras are typically required to be small and light-weight due to their characteristics. Thus, conventional optical systems with plastic or glass lens have been used, but this is limited in miniaturization.

In order to overcome such a problem, a "replica method" has been proposed, in which a plurality of lenses are provided in a single lens substrate to form an optical system. However, this method is limited in the thickness of polymer formed on the lens substrate, posing difficulty in realizing an efficient optical system.

SUMMARY OF THE INVENTION

The present invention has been made to solve the foregoing problems of the prior art and it is therefore an object of the present invention to provide a wafer scale lens which can form a diffractive surface capable of calibrating aberrations by providing both a diffraction surface and a refractive surface on a single lens substrate, and an optical system having the same.

It is another object of the invention to provide a wafer scale lens which reduces the angle of the light incident onto the diffraction surface to effectively calibrate a large angle of view, thereby realizing high diffraction efficiency and excellent picture quality, and an optical system having the same.

It is further another object of the invention to provide a wafer scale lens which once more diffuses the light passed through the diffraction surface, thereby reducing the size of an optical system, and an optical system having the same.

It is further another object of the invention to provide a wafer scale lens capable of realizing miniaturized optical system and efficient for mass production, and an optical system having the same.

According to an aspect of the invention for realizing the object, there is provided a wafer scale lens comprising: a lens substrate; a first lens element formed on the object side of the lens substrate, having a positive refractive power; a second lens element formed on the image side of the lens substrate, having a diffraction surface; and a third lens element deposited on the diffraction surface of the second lens element, having a negative refractive power.

At this time, it is preferable that the first lens element has a sag of at least 180 μm on an optical axis, and the peripheral part of the third lens element has a maximum sag of at least 150 μm in order to have a strong negative refractive power.

In addition, the diffraction surface of the second lens element comprises a planar surface or a curved surface.

Preferably, the difference in refractive indices between the second lens element and the third lens element is at least 0.1.

More preferably, the second lens element has a refractive index of at least 1.58 and the third lens element has a refractive index of up to 1.48.

Moreover, at least one of the surfaces of the lens substrate and the surfaces of the first, second, and third lens elements comprise infrared rays block coating.

According to another aspect for realizing the object of the invention, there is provided an optical system comprising: a first wafer scale lens including a first lens substrate, a first lens element formed on an object side of the first lens substrate, having a positive refractive power, a second lens element formed on the image side of the first lens substrate, having a diffraction surface, and a third lens element deposited on the diffraction surface of the second lens element, having a negative refractive power; a second wafer scale lens installed on a rear side of the first wafer scale lens, the second wafer lens including a second lens substrate, a fourth lens element formed on an object side of the second lens substrate, having a positive refractive power, a fifth lens element formed on the image side of the second lens substrate, calibrating the aberration for each field; and an image sensor for sensing an image formed at the second wafer scale lens.

At this time, it is preferable that the first lens element has a sag of at least 180 μm on an optical axis, and the peripheral part of the third lens element has a maximum sag of at least 150 μm in order to have a strong negative refractive power.

In addition, the diffraction surface of the second lens element comprises a planar surface or a curved surface. Preferably, the difference in the refractive indices between the second lens element and the third lens element is at least 0.1.

More preferably, the second lens element has a refractive index of at least 1.58 and the third lens element has a refractive index of up to 1.48.

The present invention is characterized by a wafer scale lens in which a diffraction surface and a refractive surface are simultaneously provided on a lens substrate via replica method, calibrating chromatic difference as well as reducing the angle of the light incident onto the diffraction surface to increase diffraction efficiency and remove high order diffraction light, thereby achieving high resolution, and an optical system having the same.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a partially magnified view of the optical system illustrated in FIG. 1a;

DETAILED DESCRIPTION OF THE PREFERRED EMBODIMENT

Preferred embodiments of the present invention will now be described in detail with reference to the accompanying drawings.

Figure 1A:
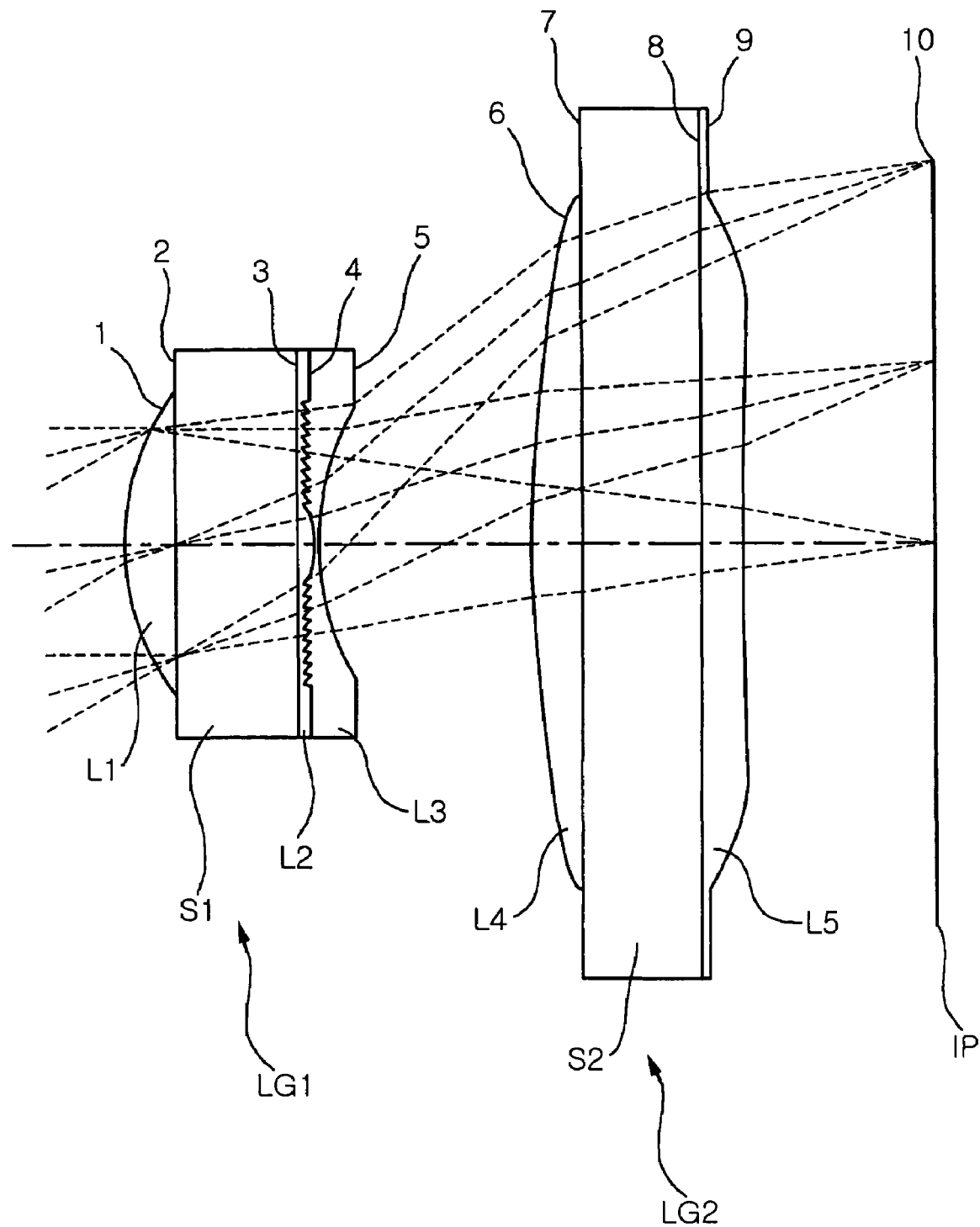
FIG. 1a is a diagram of lens arrangement in an optical system having wafer scale lenses according to a first embodiment of the present invention.

FIG. 1a is a diagram of lens arrangement in an optical system having wafer lenses according to a first embodiment of the present invention.

In the drawings, thicknesses, dimensions and shapes may be somewhat exaggerated for clarity. In particular, the shapes of the spherical or non-spherical surfaces in the diagrams are only illustrative and do not limit the present invention.

As shown in FIG. 1a, the optical system having the wafer scale lenses according to the embodiment of the present invention includes, sequentially from the object side, a first wafer scale lens LG1, a second wafer scale lens LG2 and an image sensor (not shown) corresponding to an image plane (IP).

The wafer scale lens LG1 includes a first lens substrate S1; a first lens element L1 formed on the object side plane 2 of the first lens substrate, having a positive refractive power; a second lens element L2 formed on the image side plane 3 of the first lens substrate S1, having a diffraction surface 4; and a third lens element L3 deposited on the diffraction surface 4 of the second lens element L2, having a negative refractive power. In this case, the second lens element L2 is a type of Diffractive Optical Element (DOE).

In addition, the second wafer scale lens LG2 includes a second lens substrate S2; a fourth lens element L4 formed on the object side plane 7 of the second lens substrate S2, having a positive refractive power; and a fifth lens element L5 formed on the image side plane 8 of the second lens substrate S2, calibrating the aberration for each field.

Moreover, the image sensor is positioned on the image plane and is composed of Charge-Coupled Device (CCD) or Complementary Metal-Oxide Semiconductor (CMOS) to sense and convert the light image passed through the first scale lens LG1 and the second scale lens LG2 into electric signals.

In addition, an aperture (not shown) is installed on the object side plane 2 of the first lens substrate S1.

Behind the second wafer scale lens LG2, an infrared ray filter or a cover glass may be installed corresponding to an optical low-pass filter, a color filter, or a face plate, which do not substantially affect the optical characteristics of the present invention.

Figure 1B:
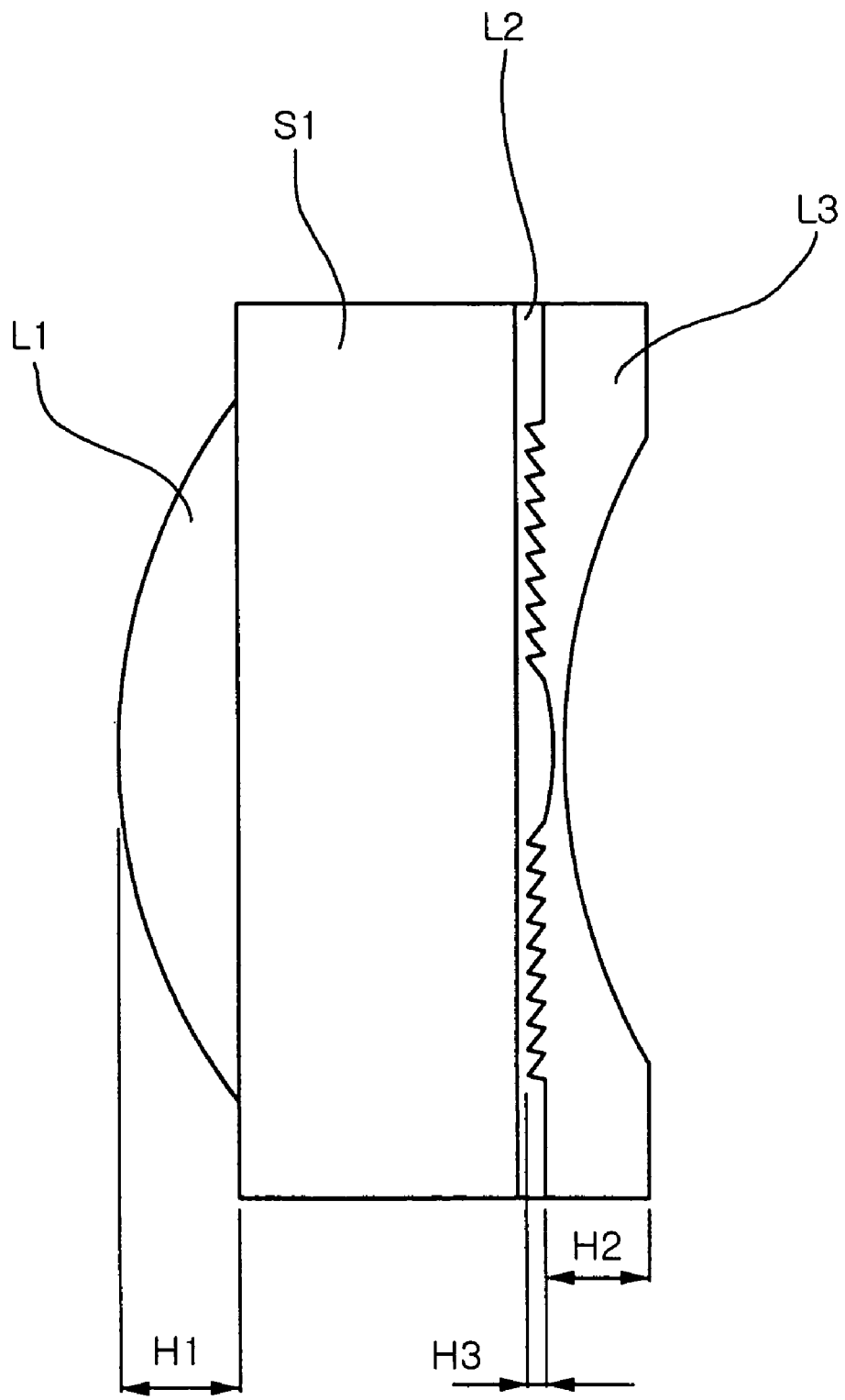

As shown in FIG. 1b, the first wafer scale lens LG1 according to the present invention includes a first lens element L1 formed on the image side plane 2 of the first lens substrate S1, having a positive refractive power; a second lens element L2 formed on the image side plane 3, composed of a Diffractive Optical Element (DOE); and a third lens element L3 formed on a diffraction surface 4 of the second lens element, having a negative refractive power.

Therefore, the refractive surface and the diffraction surface are simultaneously provided on the single lens substrate to effectively calibrate the chromatic difference.

In addition, the first lens element L1 is formed to have a sag H1 of at least 180 μm on the optical axis.

In the prior art, when fabricating a lens element according to "replica method", the height (thickness) of the polymer or the sag is limited to 50 μm or less, and thus it was difficult to realize an optical system having a strong refractive power.

In the present invention, the sag of the first lens element L1 is made larger in order to provide a lens element with a strong positive refractive power.

In order to fabricate the lens element in a large thickness, a plurality of polymer layers having small thicknesses may be formed, which however does not limit the present invention.

Therefore, the sag H1 on the optical axis of the first lens element L1 can be made larger to provide a strong refractive power.

Thereby, a large angle of view is effectively calibrated and the angle of light incident onto the second lens element L2 is decreased, increasing diffraction efficiency of the Diffractive Optical Element (DOE) so that high order diffraction light acting as noise at the image sensor is eliminated to improve picture quality.

As shown in FIG. 1b, the Diffractive Optical Element (DOE) provided on the image side plane S1 of the first lens substrate S1, i.e. the second lens element L2 is composed of a diffraction surface 4 having a relief (prism-shaped) pattern on a flat or curved surface.

In particular, in case when the Diffractive Optical Element (DOE) is formed on a curved surface, effect of having one more diffraction surface can be expected, which allows realizing an efficient optical system.

The diffraction surface 4 is formed integrally with the polymer deposited on the first lens substrate S1, and after the diffraction surface 4 is cured, a third lens element L3 is formed atop the cured diffraction surface 4.

In the meantime, the grating height H3 of the diffraction grating in FIG. 1b is the difference between the height of the concave part and the convex part and determined by the difference in refractive indices of the adjacent lens elements L2, L3.

In general, when determining the relief pattern of the Diffractive Optical Element (DOE) to provide the same optical functions, the grating height H3 is in inverse proportion to the difference between the refractive indices of the adjacent lens elements L2, L3. In other words, if the difference between the refractive indices of the adjacent lens elements L2, L3 is made greater, the height of the grating can be lowered.

At this time, considering the precision of machining and machinability of the relief pattern, it is preferable that the grating height of the relief pattern is low.

In the wafer scale lenses and the optical system having the same according to the present invention, it is preferable that the difference between the refractive indices of the second lens element L2 and the third lens element L3 is at least 1.0 in order to obtain a low height of the relief pattern.

In addition, considering the material of the polymer used in the second lens element L2 and the third lens element L3, it is preferable that the second lens element L2 has a refractive index of at least 1.58 and the third lens element L3 has a refractive index of up to 1.48.

Meanwhile, the third lens element L3 is formed on the diffraction surface 4 and has a negative refractive power.

The third lens element L3 having a negative refractive power is provided to diffuse once again the light passed through the third lens element L3, thereby allowing size reduction of the optical system.

Therefore, in order to miniaturize the optical system, it is preferable that the third lens element L3 has a strong negative refractive power, for which it is preferable that the maximum sag at the peripheral part of the third lens element L3 is at least 150 μm.

In addition, the optical system having the wafer scale lens according to the present invention also includes a second wafer scale lens LG2 formed on a second lens substrate S2, having a fourth lens element L4 and a fifth lens element L5.

The fourth lens element L4 is provided on the object side plane 7 of the second lens substrate S2, having a positive refractive power, and has a function of converging the light diffused at the third lens element L3 of the first wafer scale lens LG1.

In addition, the fifth lens element L5 is formed on the image side plane 8 of the second lens substrate S2, carrying out the function of calibrating the aberration for each field.

In the meantime, at least one of the surfaces of the first lens substrate S1, the second lens substrate S2, the first to fifth lens elements L1, L2, L3, L4, and L5 may be coated to block ultraviolet rays, in which case there is no need for an additional ultraviolet ray filter.

The present invention will be described in more detail with specific embodiments.

As described above, in the following Examples 1 to 3 and Comparative Example, an optical system includes a first wafer scale lens LG1, a second wafer scale lens LG2 and an image sensor (not shown) corresponding to the image plane (IP).

The first wafer scale lens LG1 includes a first lens substrate S1; a first lens element L1 formed on the object side plane 2 of the first lens substrate S1, having a positive refractive power; a second lens element L2 formed on the image side plane 3 of the first lens substrate S1, having a diffraction surface 4; and a third lens element L3 deposited on the diffraction surface of the second lens element L2, having a negative refractive power. The second wafer scale lens LG2 includes a second lens substrate S2; a fourth lens element L4 formed on the object side plane 7 of the second lens substrate S2, having a positive refractive power; and a fifth lens element L5 formed on the image side plane 8, calibrating the aberration for each field.

In addition, the image sensor is disposed on the image plane (IP), an aperture (not shown) is disposed on the object side plane2 of the first lens substrate S1, and an optical filter composed of an infrared rays filter and a cover glass may be disposed between the second wafer scale lens LG2 and the image plane IP.

Aspherical surfaces used in each of the following embodiments and comparative embodiment are obtained from the following generally-known Equation 1. "E and a number following the E" used in a conic constant K and aspherical coefficients A, B, C and D represent a 10's power. For example, E+01 and E−02 represent $10^1$ and $10^{-2}$, respectively.

$$Z = \frac{cY^2}{1+\sqrt{1-(1+K)c^2Y^2}} + AY^4 + BY^6 + CY^8 + DY^{10} + EY^{12} + FY^{14} + ... \quad \text{Equation 1}$$

Z: distance toward optical axis from vertex of lens
Y: distance toward direction perpendicular to optical axis
c: reciprocal number of radius r of curvature on vertex of lens
K: conic constant
A, B, C, D, E and F: aspherical coefficients In addition, the fourth plane in each of the following embodiments and comparative embodiment is the diffraction surface of the Diffractive Optical Element (DOE), obtained from the following Equation 2.

$$\phi = \frac{2\pi}{\lambda}(a_1Y^2 + a_2Y^4 + a_3Y^6 + a_4Y^8 + a_5Y^{10} + a_6Y^{12} + ...) \quad \text{Equation 2}$$

Φ: phase at height Y
λ: wavelength of light
Y: distance in the direction perpendicular to optical axis
$a_1, a_2, a_3, a_4, a_5, a_6$: coefficients of phase terms

EXAMPLE 1

Table 1 below shows data of lens arrangement for Example 1 according to the present invention.

FIG. 1a is a diagram of lens arrangement in an optical system having wafer scale lenses in Example 1 of the present invention and FIG. 1b is a magnified view of the first wafer scale lens. FIGS. 2a to 2c show aberrations of the optical system of Example 1 illustrated in Table 1 and FIG. 1. FIG. 3 is a graph showing MTF characteristics of Example 1.

In addition, in the following graph illustrating astigmatism, "S" represents sagittal, and "T" represents tangential.

Here, the MTF depends on a spatial frequency of a cycle per millimeter and is defined by the following Equation 3 between a maximum intensity and a minimum intensity of light.

$$MTF = \frac{Max - Min}{Max + Min} \quad \text{Equation 3}$$

That is, if the MTF is 1, a resolution is most ideal and a resolution deteriorates as the MTF is reduced.

In Example 1, the F number FNo is 2.8, the angle of view is 60 degrees, the distance from the object side plane 1 of the first lens to the image plane (hereinafter referred to as 'TL') is 3.28 mm, the effective focal length f of the optical system is 2.76 mm, the focal length f1 of the first wafer scale lens (LG1) is 3.52 mm, the focal length f2 of the second wafer scale lens (LG2) is 7.01 mm, the image height is 3.2 mm, the number of pixel is 640×480, and the size of each pixel is 4 μm.

TABLE 1

| Plane No. | Radius of Curvature R (mm) | Plane Interval t (mm) | Refractive Index $n_d$ | Abbe Number $v_d$ |
|---|---|---|---|---|
| *1 | 1.1460 | 0.2000 | 1.590 | 45.5 |
| 2 | ∞ | 0.5000 | 1.474 | 65.4 |
| 3 | ∞ | 0.0500 | 1.590 | 45.5 |
| 4 | — | 0.0200 | 1.440 | 54.8 |
| *5 | 1.2570 | 0.8800 | — | — |
| *6 | 3.0590 | 0.2000 | 1.590 | 45.5 |
| 7 | ∞ | 0.5000 | 1.474 | 65.4 |
| 8 | ∞ | 0.1800 | 1.590 | 45.5 |
| *9 | 10.4150 | — | — | — |
| 10 | ∞ | — | — | — |

Here, the diffraction surface of the fourth plane is obtained from the Equation 2, and respective coefficients are as follows:

| | |
|---|---|
| $a_1$: −0.183372E−01 | $a_2$: −0.593600E−01 |
| $a_3$: 0.266720E−02 | $a_4$: 0.105593E+01 |
| $a_5$: −0.215752E+01 | $a_6$: 0.129605E+01 |

In addition, * represents aspherical surface in Table 1. In Example 1, plane 1 (the object side plane of the first lens element), plane 5 (the image side plane of the third lens element), plane 6 (object side plane of the fourth lens element) and plane 9 (the image side plane of the fifth lens element) are aspherical surfaces.

The values of the aspherical coefficients of the Example 1 according to the Equation 1 are as in the following Table 2.

TABLE 2

| Plane No. | K | A | B | C |
|---|---|---|---|---|
| 1 | −0.092222 | −5.45670E−03 | 3.99487E−02 | −3.21342E−02 |
| 5 | 0.586871 | 3.07686E−01 | −4.39618E−01 | 4.45806E−01 |
| 6 | −33.736430 | 8.53508E−03 | −2.23646E−02 | 9.69082E−03 |
| 9 | −779.261952 | −1.8945E−02 | −1.71877E−02 | 2.22329E−03 |

EXAMPLE 2

Table 3 below shows data of lens arrangement for Example 2 according to the present invention.

Figure 4:
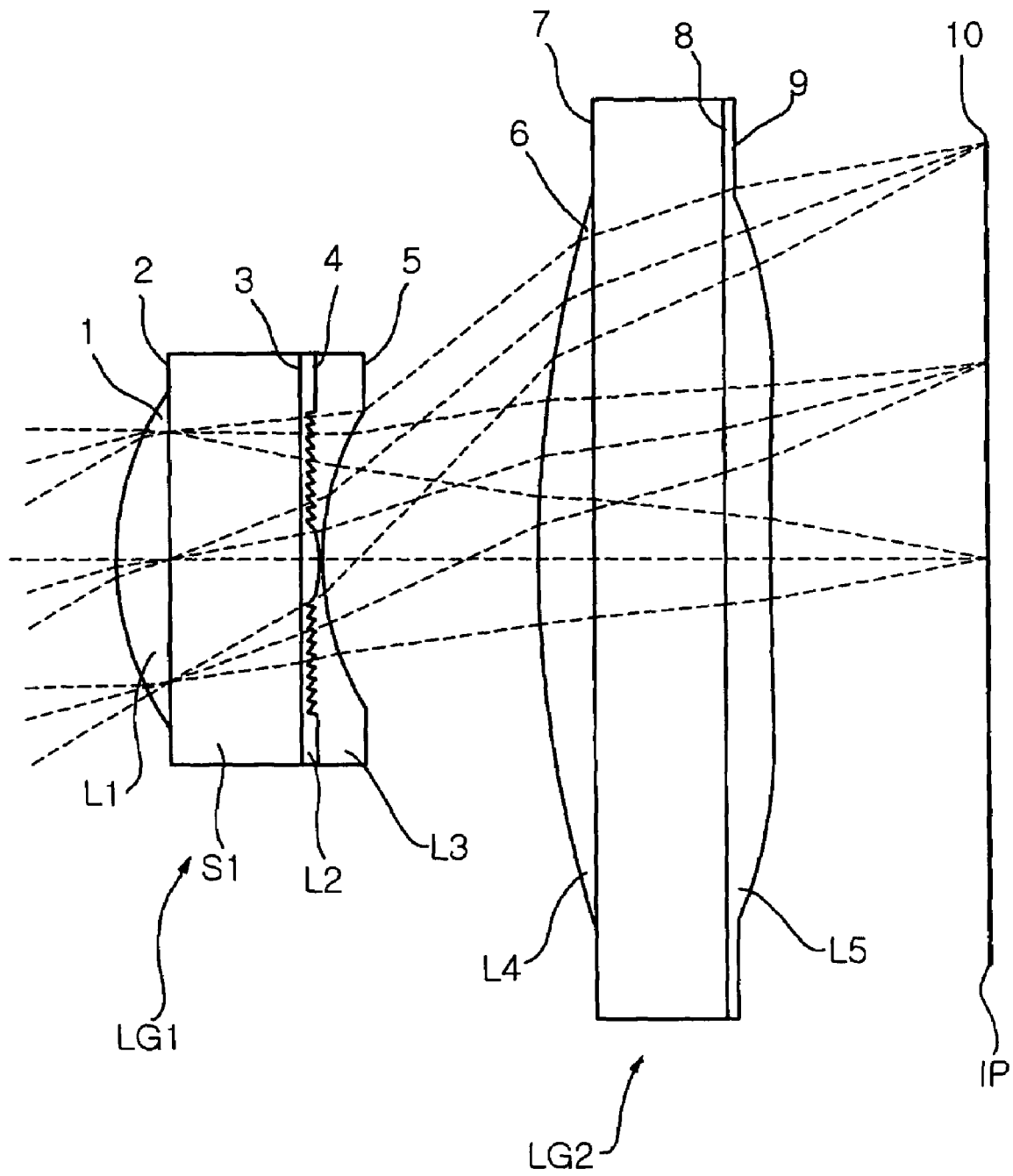
FIG. 4 is a diagram of lens arrangement in an optical system having wafer scale lenses according to a second embodiment of the present invention.

FIG. 4 is a diagram of lens arrangement in an optical system having wafer scale lenses according to the second embodiment of the present invention, and FIGS. 5a to 5c show aberrations of the optical system illustrated in Table 3 and FIG. 4. FIG. 6 is a graph illustrating MTF characteristics of the second embodiment.

In Example 2, the F number FNo is 2.8, the angle of view is 60 degrees, TL is 3.28 mm, the effective focal length f of the optical system is 2.76 mm, the focal length f1 of the first wafer scale lens LG1 is 3.53 mm, the focal length f2 of the second wafer scale lens LG2 is 6.76 mm, the image height is 3.2 mm, the number of pixel is 640×480 and the size of each pixel is 4 μm.

TABLE 3

| Plane No. | Radius of Curvature R (mm) | Plane Interval t (mm) | Refractive Index $n_d$ |
|---|---|---|---|
| *1 | 1.1320 | 0.2000 | 1.58 |
| 2 | ∞ | 0.5000 | 1.474 |
| 3 | ∞ | 0.0500 | 1.58 |
| 4 | — | 0.0200 | 1.47 |
| *5 | 1.3060 | 0.8350 | — |
| *6 | 3.2980 | 0.2000 | 1.58 |
| 7 | ∞ | 0.5000 | 1.474 |
| 8 | ∞ | 0.1800 | 1.58 |
| *9 | 18.3110 | 0.7980 | — |
| 10 | ∞ | — | — |

The diffraction surface of the fourth plane is obtained from the Equation 2, and respective coefficients are as follows:

| | |
|---|---|
| $a_1$: −0.025648 | $a_2$: −0.080843 |
| $a_3$: 0.014690 | $a_4$: 1.085626 |
| $a_5$: −2.181123 | $a_6$: 1.444613 |

In Table 3, * represents an aspherical surface. In Example 2, plane 1 (the object side plane of the first lens element), plane 5 (the image side plane of the third lens element), plane 6 (the object side plane of the fourth lens element) and plane 9 (the image side plane of the fifth lens element) are aspherical surfaces.

The values of the aspherical coefficients in Example 2 according to the Equation 1 are as in the following Table 4.

TABLE 4

| Plane No. | K | A | B | C |
|---|---|---|---|---|
| 1 | −0.085571 | −0.005940 | 0.040915 | −0.034969 |
| 5 | 0.663280 | 0.333272 | −0.409667 | 0.0368373 |
| 6 | −26.728599 | −0.018296 | −0.002653 | 0.006713 |
| 9 | 92.636350 | −0.046498 | −0.008766 | 0.001851 |

EXAMPLE 3

Table 5 below shows data of lens arrangement for Example 3 according to the present invention.

Figure 7:
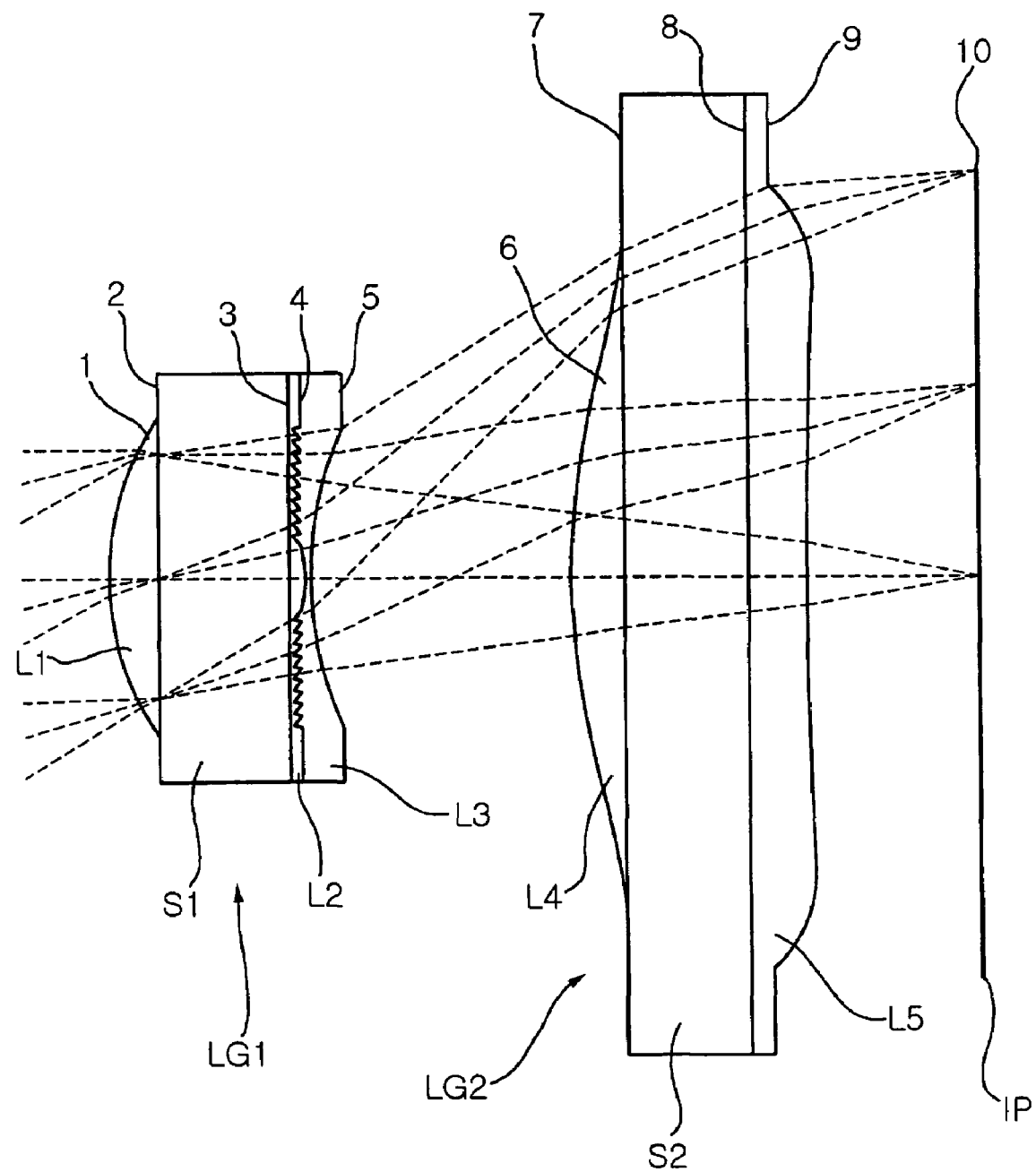
FIG. 7 is a diagram of lens arrangement of an optical system having wafer scale lenses according to a third embodiment of the present invention.

FIG. 7 is a diagram of lens arrangement in an optical system having wafer scale lenses in Example 3 according to the present invention. FIGS. 8a to 8c show aberrations of the optical system illustrated in Table 5 and FIG. 7. FIG. 9 is a graph illustrating MTF characteristics of Example 3.

In Example 3, the F number (FNo) is 2.8, the angle of view is 60 degrees, TL is 3.36 mm, the effective focal length f of the optical system is 2.76 mm, the focal length f1 of the first wafer scale lens LG1 is 3.68 mm, the focal length f2 of the second wafer lens LG2 is 6.99 mm, the image height is 3.2 mm, the number of pixels is 640×480, and the size of each pixel is 4 μm.

TABLE 5

| Plane No. | Radius of Curvature R (mm) | Plane Interval t (mm) | Refractive Index $n_d$ |
|---|---|---|---|
| *1 | 1.2250 | 0.2000 | 1.58 |
| 2 | ∞ | 0.5000 | 1.474 |
| 3 | ∞ | 0.0500 | 1.58 |
| 4 | — | 0.0200 | 1.47 |
| *5 | 1.5440 | 1.0230 | — |
| *6 | 2.2430 | 0.2000 | 1.58 |
| 7 | ∞ | 0.5000 | 1.474 |
| 8 | ∞ | 0.1800 | 1.58 |
| *9 | 4.2452 | 0.6880 | — |
| 10 | ∞ | — | — |

Here, the diffraction surface of the fourth plane is obtained from the Equation 2, and respective coefficients are as follows:

$a_1$: −0.02     $a_2$: 0
$a_3$: 0          $a_4$: 0
$a_5$: 0          $a_6$: 0

In addition, in Table 5, * represents an aspherical surface. In the third embodiment, plane 1 (the object side plane of the first lens element), plane 5 (the image side plane of the third lens element), plane 6 (the object side plane of the fourth lens element) and plane 9 (the image side plane of the fifth lens element) are aspherical surfaces.

The values of the aspherical coefficients of Example 3 according to the Equation 1 are as in the following Table 6.

TABLE 6

| Plane No. | K | A | B | C |
|---|---|---|---|---|
| 1 | 0.4172 | −0.0187 | −0.0323 | 0.0117 |
| 5 | −1.1670 | 0.1694 | 0.1418 | 0.0906 |
| 6 | −8.3292 | −0.0360 | 0.0357 | −0.0177 |
| 9 | −2.6618 | −0.0764 | 0.0340 | −0.0125 |

COMPARATIVE EXAMPLE

In Comparative Example, optical conditions such as the focal length, TL, angle of view, F number are set similar to Example 3, except that the sag H1 of the first lens element and the sag H2 of the second lens element are formed smaller.

Table 7 below shows data of lens arrangement for the Comparative Example according to the present invention.

Figure 10:
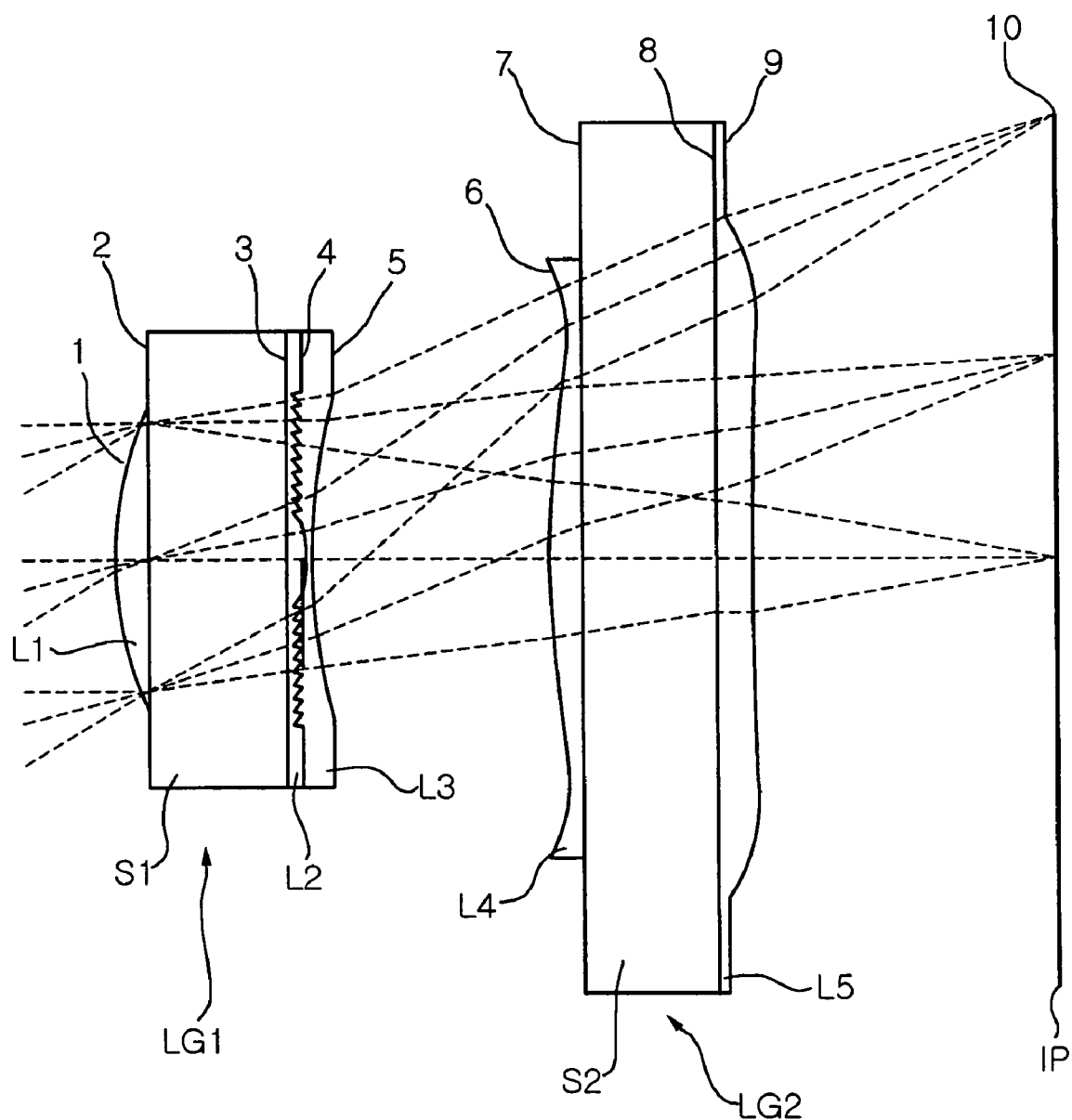
FIG. 10 is a diagram of lens arrangement in an optical system of Comparative Embodiment.

FIG. 10 is a diagram of lens arrangement in an optical system according to the comparative example and FIG. 11a to 11c show aberrations of the optical system illustrated in Table 7 and FIG. 10. FIG. 12 shows MTF characteristics of the Comparative Example.

In the Comparative Example, the F number FNo is 2.8, the angle of view is 60 degrees, TL is 3.37 mm, the effective focal length f of the optical system is 2.74 mm, the focal length f1 of the first wafer scale lens LG1 is 3.70 mm, the focal length f2 of the wafer scale lens LG2 is 6.60 mm, the image height is 3.2 mm, the number of pixels is 640×480, and the size of each pixel is 4 μm.

TABLE 7

| Plane No. | Radius of Curvature R (mm) | Interval t (mm) | Refractive Index $n_d$ |
|---|---|---|---|
| *1 | 1.4120 | 0.1200 | 1.58 |
| 2 | ∞ | 0.5000 | 1.474 |
| 3 | ∞ | 0.0500 | 1.58 |
| 4 | — | 0.0200 | 1.47 |
| *5 | 2.3300 | 0.8670 | — |
| *6 | 2.8680 | 0.1200 | 1.58 |
| 7 | ∞ | 0.5000 | 1.474 |
| 8 | ∞ | 0.1200 | 1.58 |
| *9 | 10.1980 | 1.0700 | — |
| 10 | ∞ | — | — |

Here, the diffraction surface of the fourth plane is obtained from the Equation 2, and respective coefficients are as follows:

$a_1$: −0.0145     $a_2$: −0.0739
$a_3$: 0.0895       $a_4$: 0
$a_5$: 0              $a_6$: 0

In Table 7, * represents an aspherical surface. In the Comparative Example, plane 1 (the object side plane of the first lens element), plane 5 (the image plane of the third lens element), plane 6 (the object side plane of the fourth lens element) and plane 9 (the image side plane of the fifth lens element) are aspherical surfaces.

The values of the aspherical coefficients of the Comparative Example according to the Equation 1 are as in the following Table 8.

TABLE 8

| Plane No. | K | A | B | C |
|---|---|---|---|---|
| 1 | −0.1897 | −0.0144 | 0.0683 | −0.0856 |
| 5 | −0.7897 | 0.2416 | −0.4472 | 0.6271 |
| 6 | −13.7885 | −0.0340 | −0.0329 | −0.0246 |
| 9 | 53.9150 | −0.0357 | −0.0234 | −0.0045 |

Figure 2:
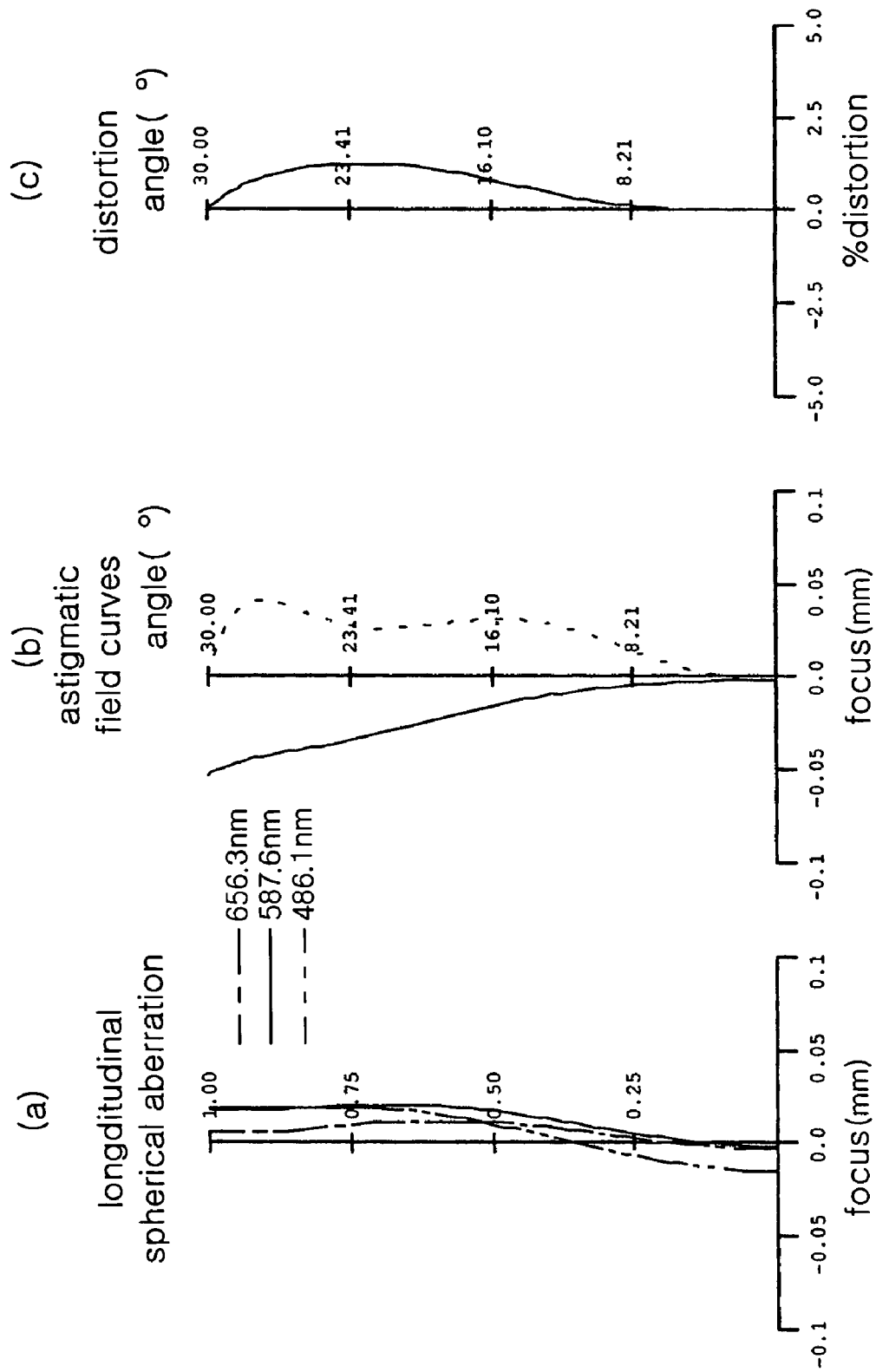
FIG. 2 illustrates aberrations of the first embodiment illustrated in FIG. 1, in which, (a) represents a spherical aberration, (b) represents astigmatism, and (c) represents distortion.
Figure 3:
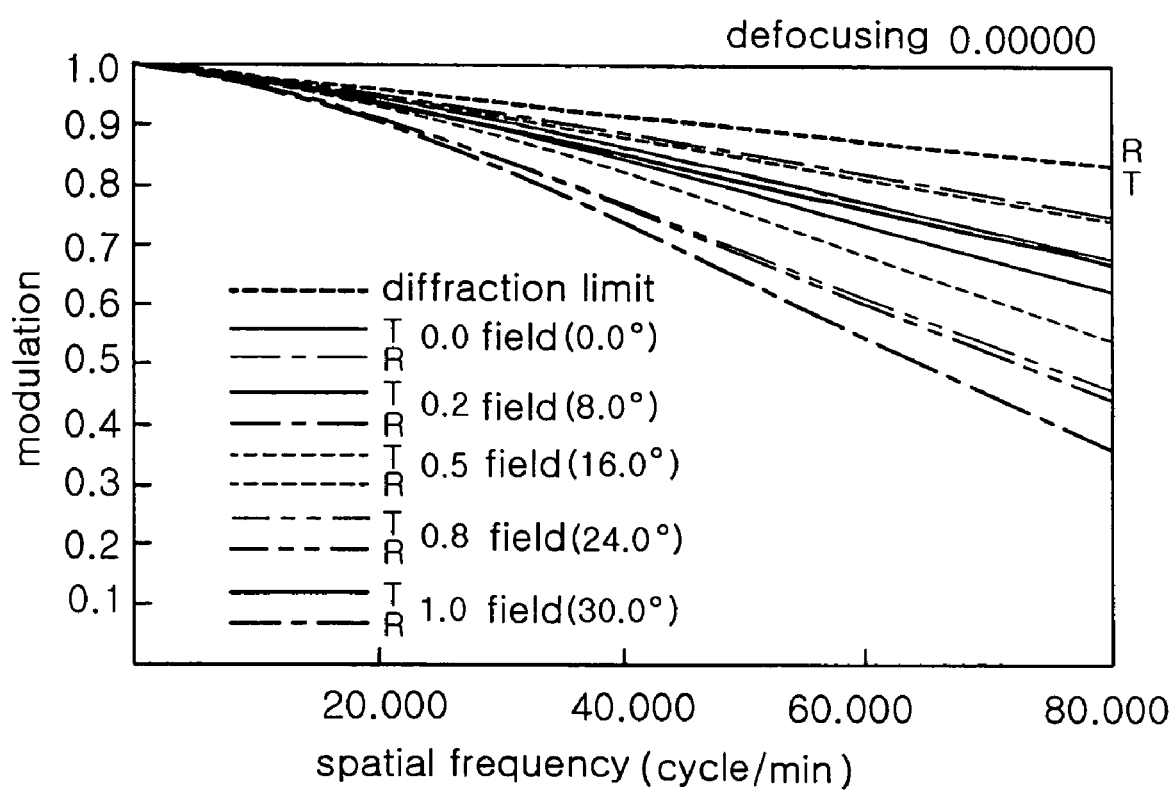
FIG. 3 is a graph illustrating Modulation Transfer Function (MTF) characteristics of the first embodiment illustrated in FIG. 1.
Figure 5:
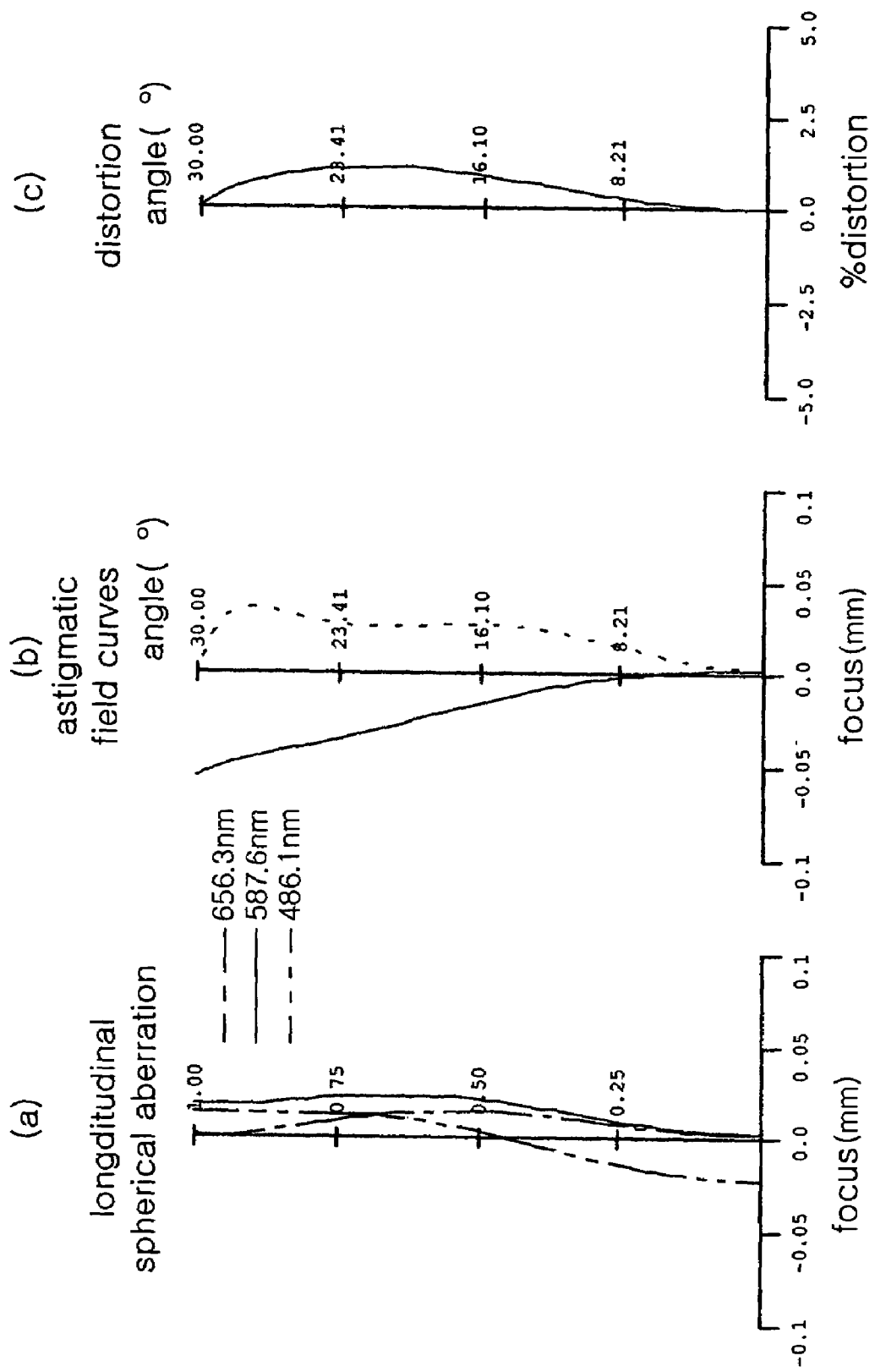
FIG. 5 illustrates aberrations of the second embodiment illustrated in FIG. 4, in which (a) represents a spherical aberration, (b) represents astigmatism, and (c) represents distortion.
Figure 6:
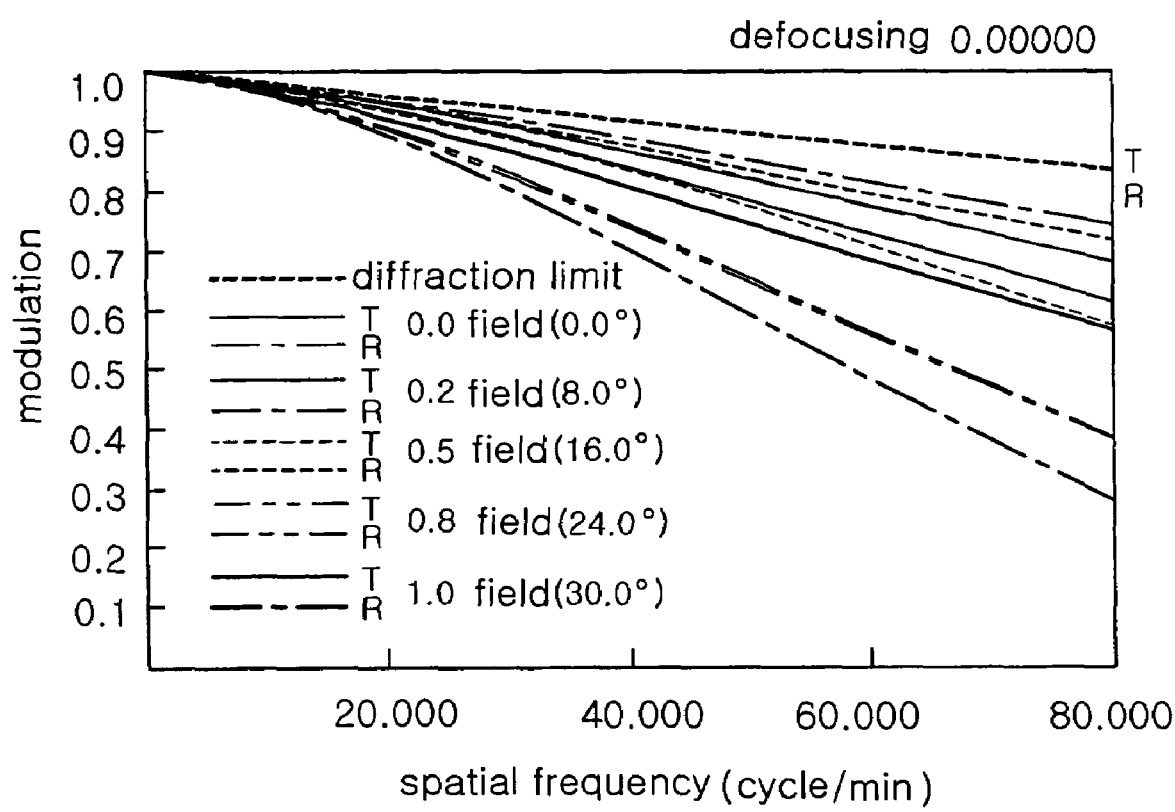
FIG. 6 is a graph illustrating MTF characteristics of the second embodiment illustrated in FIG. 4.
Figure 8:
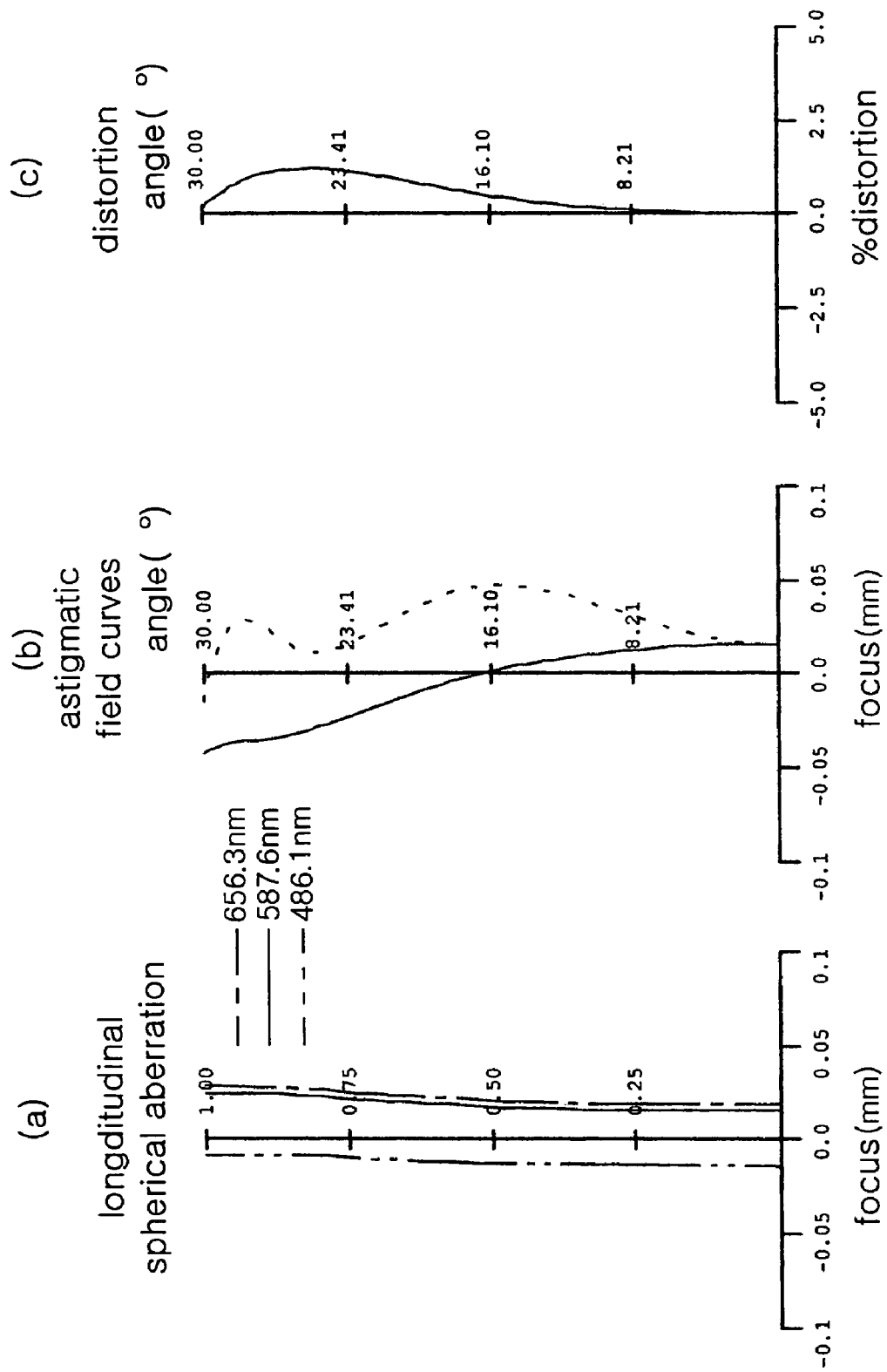
FIG. 8 illustrates aberrations of the third embodiment illustrated in FIG. 7, in which (a) represents a spherical aberration, (b) represents astigmatism, and (c) represents distortion.
Figure 9:
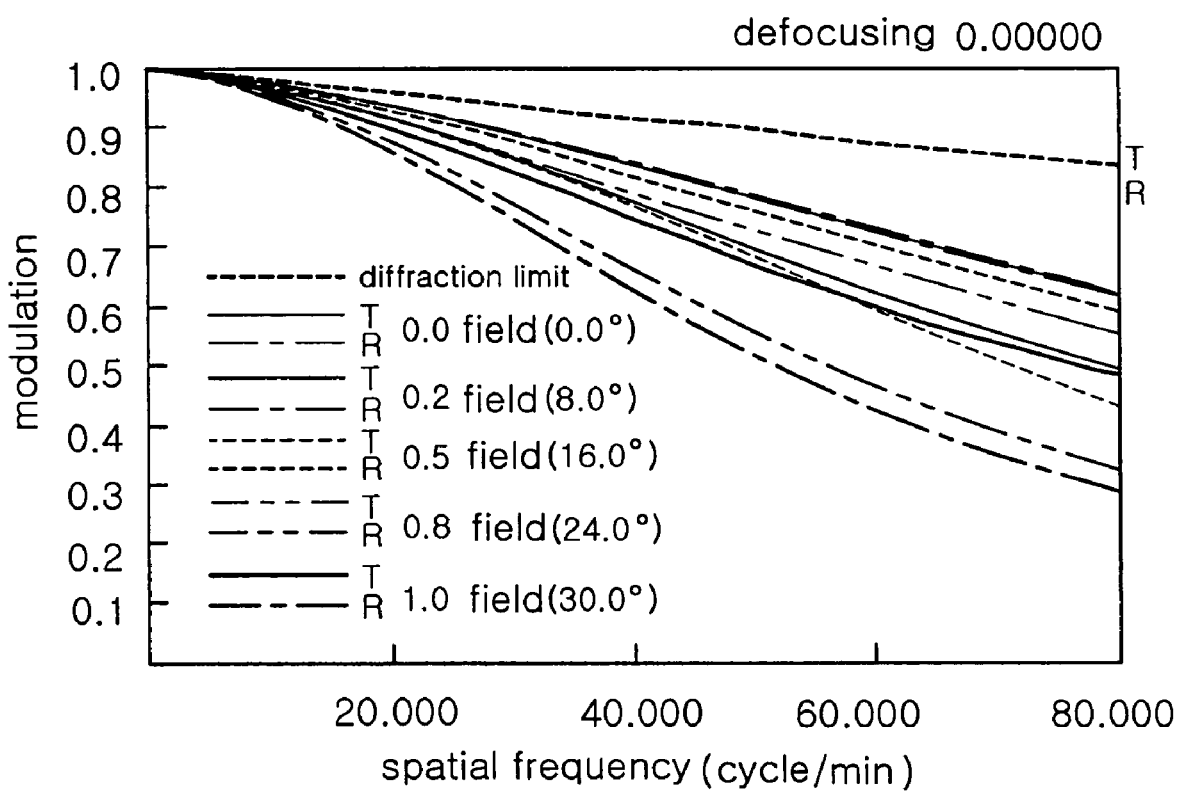
FIG. 9 is a graph illustrating MTF characteristics of the third embodiment illustrated in FIG. 7.

The above examples allow obtainment of optical systems with superior aberrational characteristics as shown in FIGS. 2, 5 and 8. Also, the above examples allow obtainment of wafer scale lenses and optical systems having the same with superior MTF characteristics and which is capable of realizing superior picture quality as shown in FIGS. 3, 6 and 9.

Figure 11:
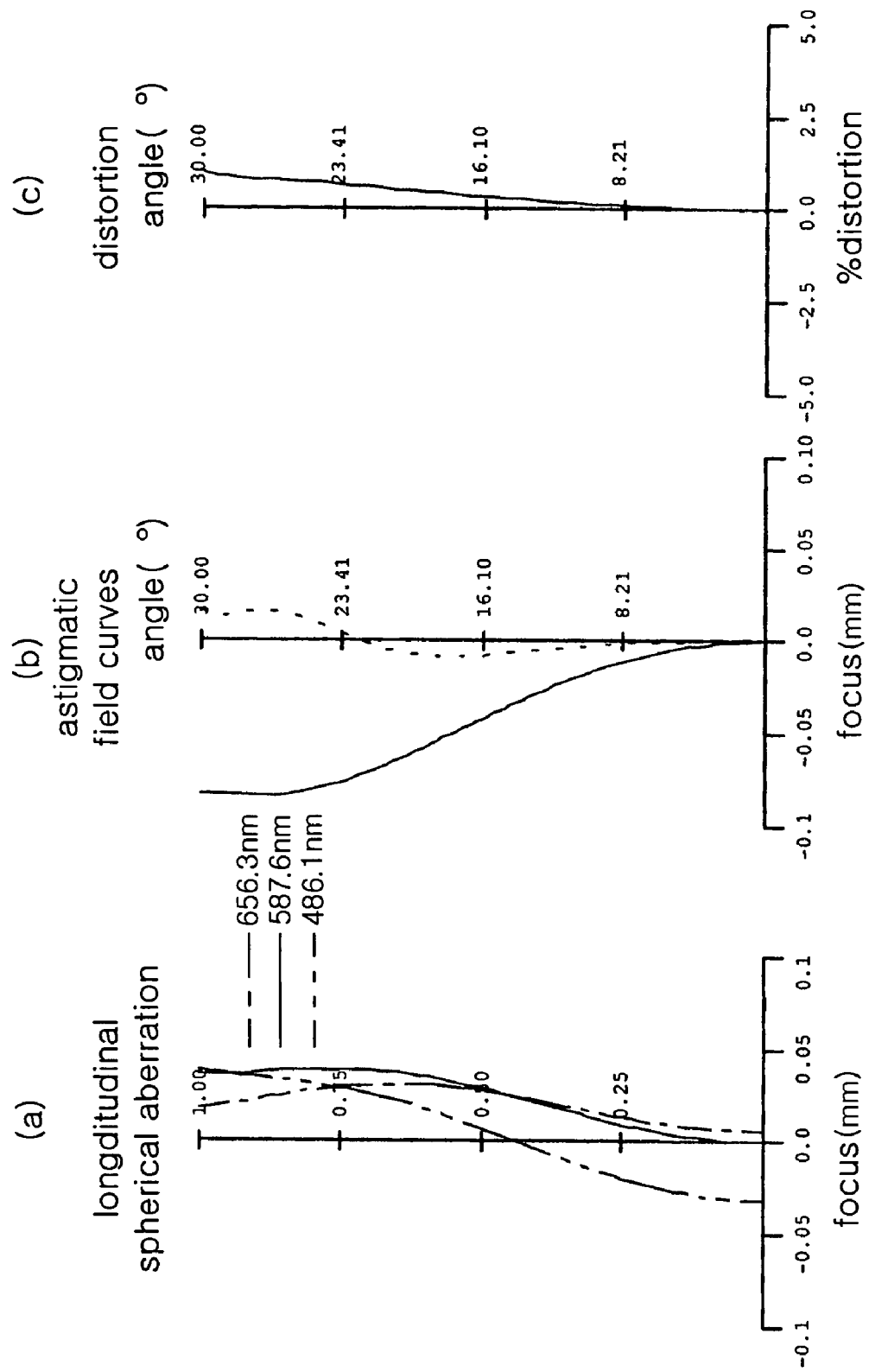
FIG. 11 illustrates aberrations of the Comparative Embodiment illustrated in FIG. 10, in which (a) represents a spherical aberration, (b) represents astigmatism, and (c) represents distortion.
Figure 12:
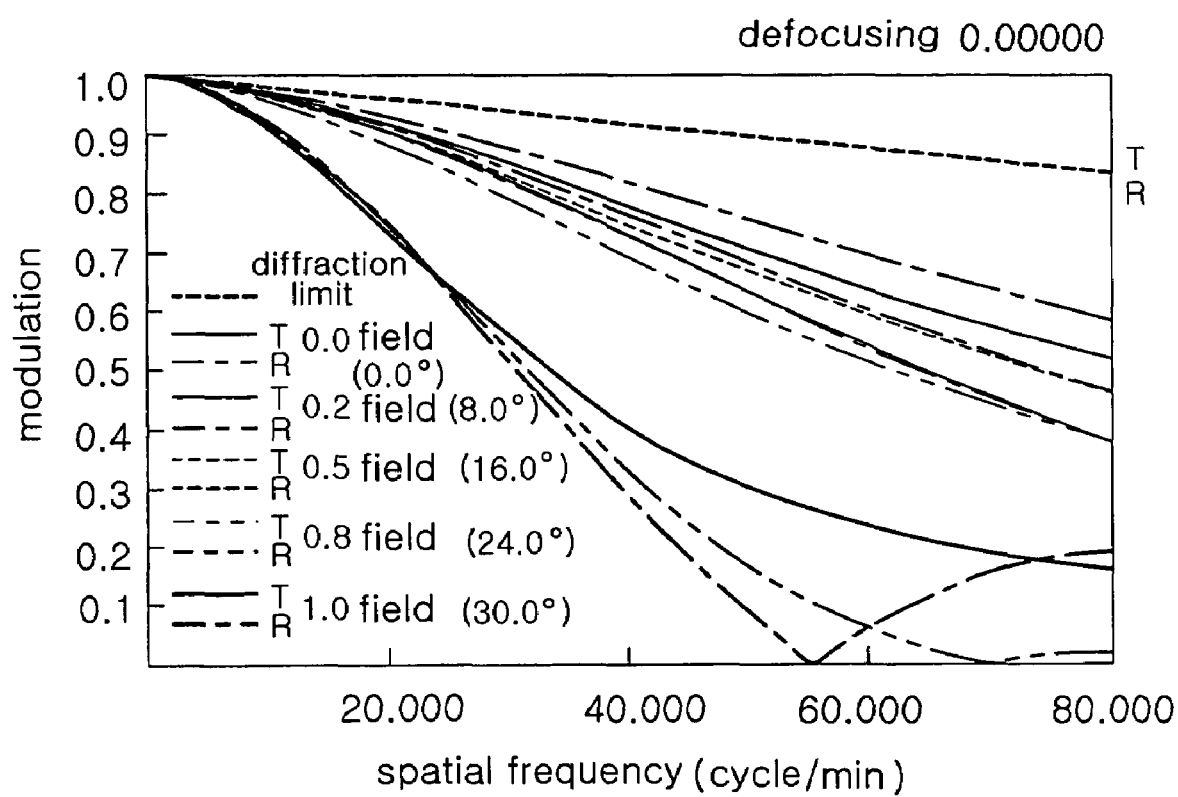
FIG. 12 is a graph illustrating MTF characteristics of the Comparative Embodiment illustrated in FIG. 10.

Compared with the Example 3, however, in the Comparative Example in which the sag H1 of the first lens element and the sag H2 of the second lens element are formed smaller, the aberrational characteristics are deteriorated as shown in FIG. 11, and in particular, the MTF characteristics are greatly degraded as shown in FIG. 12.

In other words, in the wafer scale lens and the optical system having the same according to the present invention, the diffraction surface and the refractive surface are appropriately arranged and the sags of the first and second lens elements H1 and H2 are formed large, thereby allowing obtainment of optical systems having superior aberrational and MTF characteristics.

In the present invention as set forth above, a diffraction surface and a refractive surface are simultaneously provided on a single lens substrate to efficiently calibrate the aberrations.

In addition, the sag of the first lens element is made large to reduce the angle of the light incident onto the diffraction surface, thereby larger angle of view is effectively calibrated, high diffraction efficiency is realized, and high order diffraction light is removed to realize superior picture quality.

In addition, in order to effectively diffuse the light passed through the diffraction surface, the refractive power of the third lens element is made strong, thus reducing the size of the optical system.

Moreover, the fourth lens element is provided for converging the light passed through the third lens element and the fifth lens element is provided for calibrating the aberrations for each field to realize a more efficient optical system.

Furthermore, the wafer scale lens is fabricated via the "replica method," which is appropriate for realizing miniaturized optical system and mass production of the optical systems.

While the present invention has been shown and described in connection with the preferred embodiments, it will be apparent to those skilled in the art that modifications and variations can be made without departing from the spirit and scope of the invention as defined by the appended claims.

What is claimed is:

1. A wafer scale lens comprising:
   a lens substrate;
   a first lens element formed on the object side of the lens substrate, having a positive refractive power;
   a second lens element formed on the image side of the lens substrate, having a diffraction surface; and
   a third lens element deposited on the diffraction surface of the second lens element, having a negative refractive power.

2. The wafer scale lens according to claim 1, wherein the first lens element has a sag of at least 180 µm on an optical axis.

3. The wafer scale lens according to claim 1, wherein the peripheral part of the third lens element has a maximum sag of at least 150 µm in order to have a strong negative refractive power.

4. The wafer scale lens according to claim 1, wherein the diffraction surface of the second lens element comprises a planar surface or a curved surface.

5. The wafer scale lens according to claim 1, wherein the difference in refractive indices between the second lens element and the third lens element is at least 0.1.

6. The wafer scale lens according to claim 5, wherein the second lens element has a refractive index of at least 1.58 and the third lens element has a refractive index of up to 1.48.

7. The wafer scale lens according to claim 1, wherein at least one of the surfaces of the lens substrate and the surfaces of the first, second, and third lens elements comprise infrared rays block coating.

8. An optical system comprising:
   a first wafer scale lens including a first lens substrate, a first lens element formed on an object side of the first lens substrate, having a positive refractive power, a second lens element formed on the image side of the first lens substrate, having a diffraction surface, and a third lens element deposited on the diffraction surface of the second lens element, having a negative refractive power;
   a second wafer scale lens installed on a rear side of the first wafer scale lens, the second wafer lens including a second lens substrate, a fourth lens element formed on an object side of the second lens substrate, having a positive refractive power, a fifth lens element formed on the image side of the second lens substrate, calibrating the aberration for each field; and
   an image sensor for sensing an image formed at the second wafer scale lens.

9. The optical system according to claim 8, wherein the first lens element has a sag of at least 180 µm on an optical axis.

10. The optical system according to claim 8, wherein the peripheral part of the third lens element has a maximum sag of at least 150 µm in order to have a strong negative refractive power.

11. The optical system according to claim 8, wherein the diffraction surface of the second lens element comprises a planar surface or a curved surface.

12. The optical system according to claim 8, wherein the difference in the refractive indices between the second lens element and the third lens element is at least 0.1.

13. The optical system according to claim 12, wherein the second lens element has a refractive index of at least 1.58 and the third lens element has a refractive index of up to 1.48.

* * * * *